No. 11,972. Reissued Feb. 18, 1902.

F. H. REES.

LACING HOOK.

(Application filed Nov. 19, 1901.)

WITNESSES:

Edith L. Miller

Harriet Mitchell

INVENTOR

Fred H. Rees

BY

Eugene Owen

ATTORNEY

UNITED STATES PATENT OFFICE.

FRED HOLMES REES, OF ELMIRA, NEW YORK.

LACING-HOOK.

SPECIFICATION forming part of Reissued Letters Patent No. 11,972, dated February 18, 1904.

Original No. 650,481, dated May 29, 1900. Application for reissue filed November 19, 1901. Serial No. 82,930.

*To all whom it may concern:*

Be it known that I, FRED HOLMES REES, a resident of Elmira, in the county of Chemung and State of New York, have invented certain new and useful Improvements in Lacing-Hooks; and I do hereby declare the following to be a full, clear, and exact description of the invention, such as will enable others skilled in the art to which it pertains to make and use the same.

The invention relates to hooks for lacing shoes, gloves, gaiters, and leggings and for other like purposes; and it has for its object to provide a simple, efficient, and durable article that will hold lacing in a yielding, elastic and sufficiently firm manner, whereby a satisfactory laced closure can be produced and maintained without uncomfortably and injuriously binding the ankle, wrist, or other part of the person upon which the laced article is worn.

The invention consists in the construction hereinafter described and pointed out.

Figure 1:
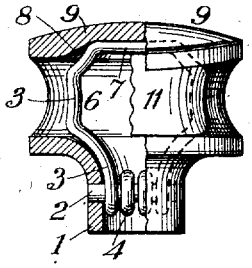
Figure 2:
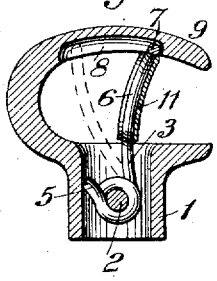
Figure 3:
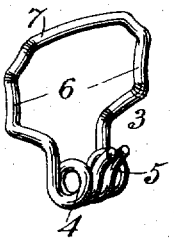
Figure 4:
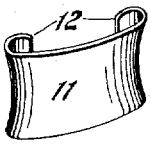
Figure 5:
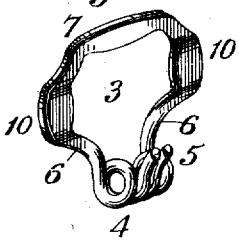
Figure 6:
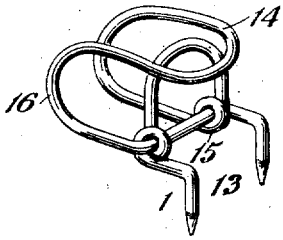

In the accompanying drawings, Figure 1 is a front elevation, partly in section. Fig. 2 is a longitudinal section. Fig. 3 is a perspective of a spring. Fig. 4 is a perspective of a lacing-protector to cover the spring. Fig. 5 is a similar view of a spring provided integrally with lacing-protectors. Fig. 6 is a perspective of the device made from a single piece of wire.

Numeral 1 denotes the shank or base of a hook, which shank is preferably tubular, as indicated, and is virtually an eyelet, whereby the hook is fixed to any desired article, as customary.

2 is a pin or rivet fixed transversely in the upper end of the eyelet-shank.

3 denotes a spring, preferably of steel wire. Each end of the spring is provided with a coil 4, surrounding the pin and having an end or extension 5 bearing upon the hook-shank or eyelet, as represented. The main part of the wire is bent to form a loop or frame 6, having side members joined by a cross member 7.

8 denotes a groove or way formed in the inner face of the head 9 of the hook. Said groove receives the member 7, which can freely play back and forth therein between the positions indicated by the full and dotted lines in Fig. 2. When not compressed, the spring-frame is situated as indicated by full lines in said figure; but under pressure it may be driven back to the position of the dotted lines. In practice this spring may have a movement of about one-eighth of an inch, and since a like yielding movement may be produced in its fellow immediately opposite there can be an expansion and contraction of about one-fourth of an inch between each pair of opposite hooks, and as this is true of every pair of oppositely-adjacent hooks it is obvious that the article laced is held upon the person in a manner to easily yield to variation of size and change of form caused by muscular exertion, heat and cold, and variable blood circulation. This in a shoe, for example, gives an ease and comfort such as pertains to the so-called "Congress" shoe or to a low shoe without the objectionable features of either. The ankles inclosed by shoes laced by the aid of the improved hooks are free to move, while they are closely covered.

The form of the spring is such that it readily receives the lacing when wound about the hooks in the usual manner, but is not liable to accidentally catch other objects, nor is it liable to become disarranged, bent, or malformed, as are the coiled springs which have lacing-buttons on their free ends.

To prevent the lacing from being cut or worn by the spring-arms, it is preferred to flatten and round them, as indicated at 10 in Fig. 5. These comparatively wide portions of the spring present curved surfaces to the lacing and provide that it may slip easily without injury by chafing.

In some cases a separate cover 11, having bent edges 12 to embrace the side arms of the spring-frame, may be employed as an anti-friction-guard, though the form first described has the advantage of cheapness and simplicity.

It is contemplated in some cases to make the hook and spring integrally of a single piece of wire bent into suitable form, as shown in Fig. 6. Such form is not preferred; but it may have a novel ornamental effect, particularly when made of precious metal, and it embodies the same principle of operation.

13 denotes extensions for securing the article to a fabric or to leather, and 14 the hook proper.

15 denotes spring-coils, and 16 is the spring-frame.

While I have described herein a preferred form of my device, I do not wish to be limited thereto, as I believe myself to be the first to produce a rigid hook with a yielding or elastic bearing-surface to receive the lacing for the purpose of permitting expansion and contraction between opposite hooks or opposite series of hooks, and other ways of forming and applying such a bearing-surface to the hook between its base and head will readily occur to those skilled in the art and still fall within the scope of my invention.

Having thus described my invention, what I claim is—

1. A rigid lacing-hook provided with an elastic bearing-surface to receive the lacing and permit of expansion and contraction between opposite hooks.

2. A lacing-hook containing an elastic bearing-surface between its base and head to receive the lacing and permit of expansion and contraction between opposite hooks.

3. A lacing-hook containing a spring-actuated member between its base and head to receive and form an elastic or yielding bearing-surface for the lacing for the purpose of permitting expansion and contraction between opposite hooks.

4. A lacing-hook having a spring member extending from its shank to its outer part and adapted to directly receive lacing wound about the hook, whereby an elastic bearing is provided for the purpose of permitting expansion and contraction between opposite hooks.

5. A lacing-hook having a spring member extending from its shank to its outer part and adapted to directly receive lacing wound about the hook, said member having side arms connected by a cross-bar.

6. A lacing-hook having a spring member extending from its shank to its outer part and adapted to directly receive lacing wound about the hook, said member having side arms connected by a cross-bar, and a recess in the outer part of the hook to receive said cross-bar.

7. A lacing-hook having a spring member extending from its shank to its outer part and adapted to directly receive lacing wound about the hook, said member being provided with a spring-coil located in the hook-shank.

8. A lacing-hook having a spring member extending from its shank to its outer part and adapted to directly receive lacing wound about the hook, said member having a coil in the hook-shank, and an extension beyond the coil to bear on the shank and hold the spring to its work.

9. A lacing-hook having a spring member extending from its shank to its outer part and adapted to directly receive lacing wound about the hook, said member being provided with a rounded guard to prevent chafing the lacing.

10. A lacing-hook having a spring member extending from its shank to its outer part and adapted to directly receive lacing wound about the hook, said spring having a rounded guard integral with the spring-arms.

In testimony whereof I have signed this specification in the presence of two subscribing witnesses.

FRED HOLMES REES.

Witnesses:
A. S. DIVEN,
EDITH L. MILLER.